Patented Sept. 3, 1929.

1,727,031

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed April 23, 1926. Serial No. 104,188.

This invention relates to non-metallic connections interposed between two metallic parts of a motor vehicle, and has particular reference to the shackles connecting the springs to the chassis frame.

An object of the invention is to provide an efficient form of non-metallic shackle which eliminates the problems of wear, noise, and lubrication found in metallic shackles.

A further object is to provide a shackle wherein the non-metallic or rubber element will undergo such limited distortions and stresses as to cause said shackle to give longer wear than those heretofore designed.

A further object is to provide such a shackle which is economical to manufacture and assemble.

Further objects and advantages of the present invention will be apparent from the following description, reference being had to the accompanying drawings, wherein a preferred form of embodiment of the present invention is clearly shown.

In the drawings.

The same reference characters refer to the same parts throughout the several views of the drawings.

Figure 1:
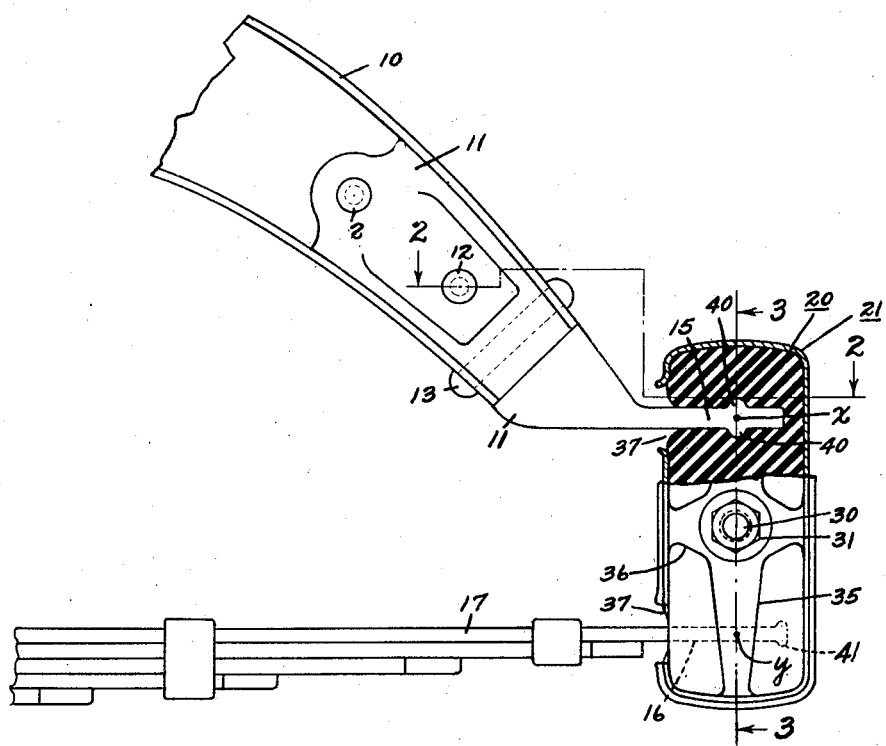
Fig. 1 is a view showing a shackle built according to this invention connecting the rear end of the rear spring of an automobile to the rear end of the chassis frame. The upper portion of the shackle is shown in section.

10 is the downwardly curved rear end of the chassis frame side channel. A forging 11 is rigidly fixed to the channel 10 by means of suitable rivets or bolts 12 and 13. The forging 11 has a substantially horizontal projection 15 which is located vertically above and approximately corresponds in shape and size to the rear end 16 of the long spring leaf 17.

The ends 15 and 16 are held spaced apart and confined within suitable recesses in a flexible rubber block designated as a whole by numeral 20. This block 20 is confined under compression within a suitable housing 21 which is entirely isolated from both the forging 11 and the spring 17.

Figure 3:
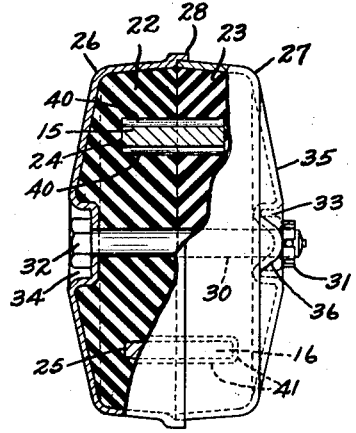
Fig. 3 is in part a section on line 3—3 of Fig. 1 and in part a rear end elevation.
Figure 2:
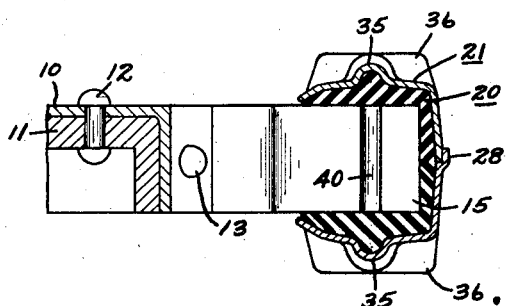
Fig. 2 is a view on line 2—2 of Fig. 1.

Preferably the rubber block 20 is molded in two separate halves 22 and 23 (see Fig. 3) with half of the recesses 24 and 25 for the insertion of ends 15 and 16 in each part 22 and 23. Preferably the metal housing 21 is also made in halves 26 and 27 so that each half of the rubber block is encased within a corresponding half of the housing, as clearly shown in Fig. 3. It is obvious that the halves 22 and 23 may be easily assembled upon the ends 15 and 16 by sliding said halves laterally thereupon, causing the ends 15 and 16 to be inserted within the recesses 24 and 25. The halves 26 and 27 of the housing 21 are held rigidly clamped together by the transverse bolt 30 by which means the rubber block is put under the desired amount of compression by tightening up on the nut 31. Preferably the abutting edges of the housing halves 26 and 27 internest, as clearly shown at 28 in Figs. 2 and 3, when they are drawn up to final position by tightening nut 31. The housing parts 26 and 27 are preferably sheet metal stampings and are so designed that they can be economically made in that manner, as will be obvious from the drawings to those skilled in the art. The tapered beads or corrugations 35 and 36 are pressed in the metal for strengthening purposes. The circular depressions 33 and 34 are pressed in the metal to provide recesses for the nut 31 and the bolt head 32 respectively and to provide proper clearance for a socket wrench to engage same.

The halves 26 and 27 of the housing 21 have clearance openings 37 to prevent any contact of the metal housing 21 with the frame member 11 or with the spring leaf 17. It is thus clear that the housing 21 floats freely on the rubber block 20 and that the housing and block are free to swing angularly as a unit to provide relative longitudinal movement between the spring end 16 and the frame member 11. During this swinging movement the block 20 pivots upon the inserted ends 15 and 16 substantially about the horizontal axes $x$ and $y$, the rubber of course being distorted slightly to permit this pivotal movement. It will be seen that, during such distortion, there is little tendency to force rubber out through the openings 37 since the inserted ends 15 and 16 displace the same volume of rubber at all times. In other words, the ends 15 and 16 do not ride in and out of the rubber block 20 to any substantial extent but merely pivot within the block and permit the block to swing angularly as a whole to provide relative longitudinal movement between the spring and frame member 11. It is thus seen that a large amount of longitudinal movement necessitates only a relatively small amount of distortion in the rubber block. This of course greatly increases the length of life of the rubber block in actual use.

The inserted end 15 is provided with the ridges 40, preferably adjacent the pivot axis x. The ridges 40 prevent any possibility of the end 15 being pulled out of its confining recess in the rubber block, and by being adjacent the axis of pivotal movement the ridges 40 have little or no effect in preventing the easy pivoting of the end 15 in the rubber block.

The inserted end 16 of the spring is shown with the ridges 41 at its extreme end, which ridges 41 serve the same purpose for the spring end 16 as the ridges 40 do for the end 15. Ridges 41 may be easily made by upsetting the end of the spring leaf.

While the form of embodiment of the present invention, as herein disclosed, constitutes a preferred form, it is to be understood that other forms might be adopted, all coming within the scope of the claims which follow.

What is claimed is as follows:

1. In combination with the spring and a member fixed to the frame of a vehicle, an extension shackle comprising: a block of flexible rubber confining the ends of the spring and the frame member in vertically spaced relation, said block being divided into two halves along a vertical plane through said spring and frame member whereby the said halves of the block may be placed over the ends of the spring and frame member from opposite sides thereof, and a metal housing confining said block under compression and isolated from both the spring and frame member.

2. In combination with the spring and a member fixed to the frame of a vehicle, an extension shackle comprising: a flexible rubber block having vertically spaced recesses into which the ends of said spring and frame member respectively are embedded, an exterior metal housing confining said rubber block under compression and having separate openings therein providing clearance for said spring and frame member, said rubber block and housing forming a swinging unit to provide relative longitudinal movement between said spring end and frame member.

3. In combination with the supporting spring and a member fixed to the frame of a vehicle, an extension shackle comprising: an angularly swinging element interconnecting the ends of said spring and frame member for permitting relative longitudinal movement therebetween, said element comprising a flexible rubber block within which said ends of the spring and frame member are embedded in spaced relation, and an exterior metal housing confining said block under initial compression.

4. In combination with the supporting spring and a member fixed to the frame of a vehicle, an extension shackle comprising: an angularly swinging element interconnecting the ends of said spring and frame member for permitting relative longitudinal movement therebetween, said swinging element comprising a flexible rubber block having vertically spaced recesses therein within which the ends of said spring and frame member respectively are inserted in isolated relation, and a metal housing confining said block under compression and isolated by rubber from both said spring and frame member.

5. In combination with the supporting spring and a member fixed to the frame of a vehicle, an extension shackle comprising: an angularly swinging element interconnecting the ends of said spring and frame member for permitting relative longitudinal movement therebetween, said element comprising a flexible rubber block within which said ends of the spring and frame member are embedded in spaced relation, and an exterior metal housing confining said block under initial compression, said housing comprising separately made halves divided along a central vertical plane and rigidly clamped upon the rubber block by a cross member extending through said block.

6. In combination with the supporting spring and a member fixed to the frame of a vehicle, an extension shackle comprising: an angularly swinging element interconnecting the ends of said spring and frame member for permitting relative longitudinal movement therebetween, said element comprising a flexible rubber block within which said ends of the spring and frame member are embedded in spaced relation, and an exterior metal housing confining said block under initial compression, said housing being divided along a vertical plane so as to permit lateral telescoping assembly thereof upon said block, and means for clamping the housing parts together to initially compress said rubber block.

7. In combination, a vehicle body supporting spring, a member rigid with the vehicle body located above the end of said spring, an angularly swinging element interconnecting the ends of said spring and rigid member, said element comprising: a flexible rubber block having two vertically spaced recesses therein within which the ends of said spring and member are inserted, and a rigid housing confining said rubber block under initial compression and isolated by said rubber block from both the spring and body member.

8. In combination, a vehicle body supporting spring, a member rigid with the vehicle body located above the end of said spring, an angularly swinging element interconnecting the ends of said spring and rigid member, said element comprising: a flexible rubber block having two vertically spaced recesses therein within which the ends of said spring and member are inserted, and a rigid housing confining said rubber block under initial compression and isolated by said rubber block from both the spring and body member, the inserted end of said body member having an enlargement thereon adjacent the pivot axis about which said member pivots within said block by internal distortion of the rubber.

In testimony whereof I hereto affix my signature.

HARVEY D. GEYER.